C. J. A. GOTTLIEB.
CROSSHEAD AND PISTON ROD CONNECTION.
APPLICATION FILED FEB. 23, 1921.
1,395,814.
Patented Nov. 1, 1921.
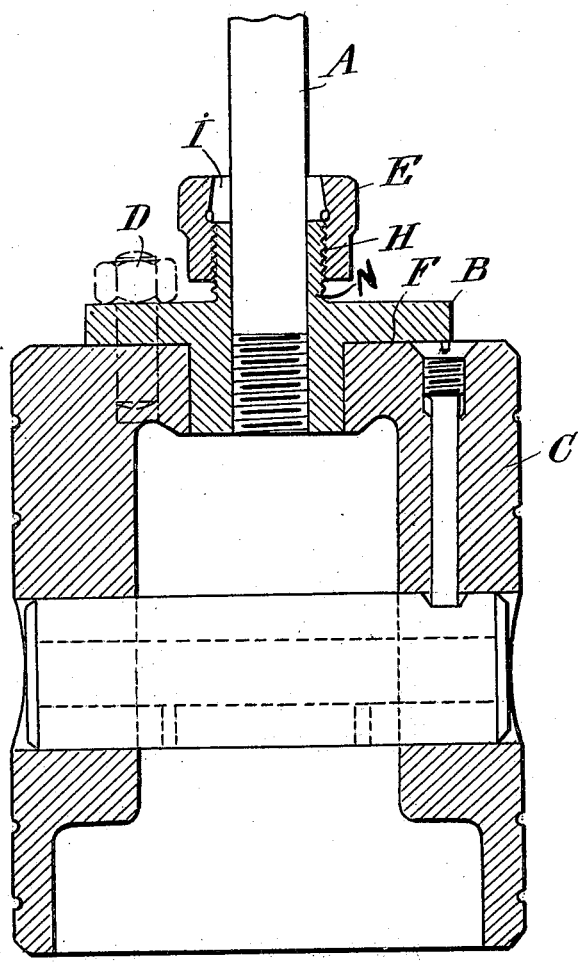

UNITED STATES PATENT OFFICE.

CARL JULIUS ALEXANDER GOTTLIEB, OF AARHUS, DENMARK.

CROSSHEAD AND PISTON-ROD CONNECTION.

1,395,814.  Specification of Letters Patent.  Patented Nov. 1, 1921.

Application filed February 23, 1921. Serial No. 447,295.

*To all whom it may concern:*

Be it known that CARL JULIUS ALEXANDER GOTTLIEB, a subject of the King of Denmark, residing at Dalgas avenue, Aarhus, Denmark, has invented certain new and useful Improvements in Crosshead and Piston-Rod Connections, of which the following is a specification.

The invention relates to improvements in cross head and piston-rod connections and more especially to such connections for compressors for gases and air. The invention has for its object to allow the adjustment of the length of the piston-rod and at the same time a true alinement of said rod.

In ordinary cross-head connections where the adjustment of the length of the piston-rod is performed by screw-threads, the piston-rod has a tendency to bend when the check-nut for preventing the connection from getting loose is tightened. This is due to the inaccuracy of the by ordinary means produced screw-threads. For producing an exact screw-thread it is necessary to use special complicated and expensive machine tools, but even by such accurate threads the small clearance necessary for the movement of the nut on the screw is sufficient to procure a little obliqueness.

Especially by thin piston-rods an inaccuracy and obliqueness of the rods due to it will be injurious and produce wear and tear and friction in the stuffing-box.

Said drawbacks are removed by the improved connection in accordance with the invention even in the case when ordinary lathes and screw-taps of the kind used in average machine shops are used for cutting the screw-threads.

A constructional form of the invention is shown on the drawing partially in vertical section.

A is the piston-rod the screw threaded end of which is screwed in a flange B fastened to the crosshead C by screws D. The number of holes bored in the flange B for the screws D is greater than the number of screws, so that the adjustment of the flange B on rod A can be done gradually corresponding to the number of screw-holes.

The flange B is provided with a neck N having exterior screw-threads for the check nut E and having an upper conical end I which is slotted to secure a firm grip on the piston-rod when the check-nut is screwed down against said upper conical part I and tightened.

The cylindrical part of the hole in the flange-neck is rather long to secure an exact centering of the piston-rod which is given a proper fit into this hole. On the contrary the threads need only to have an easy fitting.

When the check-nut E after the adjustment of the flange on the piston-rod is tightened a firm grip on the piston rod is obtained, so that the face F of the flange B will be exactly in right angle to the longitudinal axis of the piston-rod.

I claim:—

1. Crosshead and piston-rod connection, characterized by a crosshead, a connection piece fixed to said cross head and having a partially threaded, partially smooth bore for the piston-rod and provided with a slotted end in continuance of said bore, and a check-nut which when screwed on the connection-piece over its slotted end secures a firm grip on the rod.

2. Crosshead and piston-rod connection, characterized by a crosshead, a connection-piece adjustably fixed to said crosshead and having a partially threaded partially smooth bore for the piston-rod and provided with a conical slotted end in continuance of said bore, external screw-threads on said connection-piece, and a check-nut which when screwed on the connection-piece, over its conical slotted end secures a firm grip on the rod.

In testimony whereof he affixes his signature.

CARL JULIUS ALEXANDER GOTTLIEB